(12) United States Patent
Attard et al.

(10) Patent No.: US 6,203,925 B1
(45) Date of Patent: Mar. 20, 2001

(54) POROUS METAL AND METHOD OF PREPARATION THEREOF

(75) Inventors: George Simon Attard, Southampton (GB); Christine Goeltner, Bad Hersfeld (DE)

(73) Assignee: University of Southampton, Highfield (GB)

( * ) Notice: Subject to any disclaimer, the term of this patent is extended or adjusted under 35 U.S.C. 154(b) by 0 days.

(21) Appl. No.: 09/367,997

(22) PCT Filed: Feb. 25, 1998

(86) PCT No.: PCT/GB98/00587
§ 371 Date: Dec. 8, 1999
§ 102(e) Date: Dec. 8, 1999

(87) PCT Pub. No.: WO98/37997
PCT Pub. Date: Sep. 3, 1998

(30) Foreign Application Priority Data

Feb. 25, 1997 (GB) .................................................. 9703920

(51) Int. Cl.$^7$ ....................................................... B32B 5/18
(52) U.S. Cl. ................................. 428/613; 75/722; 75/732
(58) Field of Search ............................. 428/603; 75/722, 75/732

(56) References Cited

U.S. PATENT DOCUMENTS

| | | | |
|---|---|---|---|
| 4,070,207 | * | 1/1978 | Holdeman . |
| 4,977,038 | * | 12/1990 | Sieradzki et al. . |
| 4,983,217 | * | 1/1991 | Lopez Quintela et al. . |
| 5,718,878 | * | 2/1998 | Zhang . |
| 5,837,639 | * | 11/1998 | Kresge et al. . |
| 5,855,864 | * | 1/1999 | Pinnavaia et al. . |
| 5,958,367 | * | 9/1999 | Ying et al. . |
| 6,054,111 | * | 4/2000 | Antonietti et al. . |
| 6,056,545 | * | 5/2000 | Lemchen . |

FOREIGN PATENT DOCUMENTS 0 370 939 * 5/1990 (EP) .

OTHER PUBLICATIONS

Goltner et al., Mesoporous Material by Templating of Liquid Crystalline Phases, Adv. Mater. 9. No. 5, pp. 431–436, 1997 No Month.*

Attard et al., Mesoporous Platinum Films from Lyotropic Liquid Crystalline Phases, Science, vol. 278, pp. 838–840, Oct. 1997.*

Piraux et al., Template Synthesis of Nanoscale Materials Using the Membrane Porosity, V. Research in Applications, pp.357–363, 1997 No Month.*

Attard et al., Liquid–Crystal Templates for the Nanostructured Metals, Angew. Chem. Int. Ed. Engl. Oct. 1997, 36. No. 12, pp. 1315–1317.*

Braun et al., Semiconducting Superlattices Templated by Molecular Assemblies, Nature, vol. 380, pp. 325–328, Mar. 1996.*

Attard et al., Liquid–Crystalline Phases as Templates for the Synthesis of Mesoporous Silica, Nature, vol. 378, pp. 366–368, Nov. 1995.*

Tanori et al., Synthesis of nanosize metallic and alloyed particles in ordered phases, Colloid Polym. Sci. 1995, 273, pp. 886–892, No Month.*

* cited by examiner

Primary Examiner—Deborah Jones
Assistant Examiner—Jason Savage
(74) Attorney, Agent, or Firm—Price, Heneveld, Cooper, DeWitt & Litton

(57) ABSTRACT

A method of preparing a porous metal comprises reducing a mixture comprising (I) a source of metal; (II) a solvent such as water; and (III) a structure-directing agent such as octaethylene glycol monododecyl ether to form a liquid crystalline phase in the mixture. The reduction of the mixture having a liquid crystalline phase, for example using zinc metal as reducing agent, provides a porous film having a substantially regular structure and substantially uniform pore size.

10 Claims, 1 Drawing Sheet

POROUS METAL AND METHOD OF PREPARATION THEREOF

This invention relates to porous metal-based materials, in particular porous metal-based materials having a substantially regular structure and uniform pore size, and to a method of preparing porous metal-based materials by reduction of a mixture containing a source of metal.

BACKGROUND OF THE INVENTION

Porous metals have found extensive applications in filtration, gas-flow control, catalysis, fuel cells, and batteries. Their open and interconnected microstructure allows facile diffusion of reactants and electrolytes to their relatively large surface areas. Conventionally, porous metals have been grouped into three categories on the basis of their microstructure, these categories being metal sponges or foams, supported aggregated colloidal metals, and micromachined metals. Metal sponges and supported aggregated colloidal metals represent the most important classes of porous metals and have been used for many years in industrial applications. Typical examples of these materials are platinum and palladium catalysts. Metal sponges are composed of an irregular framework of metal, 1 micrometer to 100 micrometers thick, surrounding interconnected pores with sizes in the range 0.5 micrometer to about 160 micrometers. Aggregated colloidal metals are composed of small primary particles of metal, typically spherical and of diameters in the range 2 nanometers to 1 micrometer, which are aggregated into large particles of irregular size and shape. These aggregated particles are often supported by non-metallic materials. The variability in pore sizes of metal sponges and aggregated colloidal metals is typically quite high. The sizes of pores in these materials span the top end of the mesoporous range, and the macroporous range. For the purpose of this application, the term mesoporous refers to pore sizes in the range approximately 13 to 200 Å, and macroporous refers to pore sizes greater than about 200 Å.

Conventional processes for preparing porous metals include powder sintering and electrochemical deposition. However, as described above these tend to produce metals with a variable pore size, generally in the macroporous range, which may not give a large specific surface area and the variable pore size does not permit its use for size-selective catalysis.

In the drive towards providing porous metals showing improved properties, for use in for example catalysts, batteries, fuel cells, electrochemical capacitors, quantum confinement effect devices, optical devices, sensors, electrosynthesis, electrocatalysis and filtration or chemical separation, to our knowledge no one has yet succeeded in developing an effective process for preparing at least mesoporous metal-based materials of regular structure and uniform pore size, with the attendant advantages in terms of properties which such metal-based materials might be expected to show.

Previously, we have shown that porous ceramic oxide monoliths can be condensed from lyotropic liquid crystalline phase media, whereby the liquid crystalline phase topology directs the synthesis of the material into a corresponding topology showing structural regularity and uniformity of pore size. However, it was not expected that this templating mechanism could be used to synthesise porous metal-based materials.

SUMMARY OF THE INVENTION

What we have found, surprisingly, is that porous metal-based materials can be prepared from homogeneous lyotropic liquid crystalline phases. Accordingly, the present invention provides a method of preparing a porous metal-based material having a substantially regular structure and uniform pore size which comprises reducing a mixture comprising: a source of metal; a solvent; and a structure-directing agent present in an amount sufficient to form a liquid crystalline phase in the mixture, to form a composite of metal-based material and organic matter, and optionally removing organic matter from the composite. Also, the invention provides a porous metal-based material having a substantially regular structure and substantially uniform pore size, wherein the pore size is in the mesoporous range.

DETAILED DESCRIPTION OF THE INVENTION

According to the method of the invention, a liquid crystalline mixture is formed and reduced. The mixture comprises a source material for the metal, dissolved in a solvent, and a sufficient amount of an organic structure-directing agent to provide an homogeneous lyotropic liquid crystalline phase for the mixture.

One or more source materials may be used in the mixture, for reduction to one or more metals. Thus, by appropriate selection of source material, the composition of the porous metal-based material can be controlled as desired. Suitable metals include for example the first, second and third row transition metals, in particular platinum, palladium, gold, silver, nickel, cobalt, copper, iron, lead, tin and indium, preferably platinum, palladium, gold and nickel. The metals may contain surface layers of, for example, oxides, sulphides or phosphides. Suitable source materials include hexachloroplatinic acid and ammonium tetrachloropalladate, preferably hexachloroplatinic acid.

The solvent is included in the mixture in order to dissolve the source material and to form a liquid crystalline phase in conjunction with the structure-directing agent, thereby to provide a medium for reduction to the porous metal. Generally, water will be used as the preferred solvent. However, in certain cases it may be desirable or necessary to carry out the reduction in a non-aqueous environment. In these circumstances a suitable organic solvent may be used, for example formamide or ethylene glycol.

The structure-directing agent is included in the mixture in order to impart an homogeneous lyotropic liquid crystalline phase to the mixture. The liquid crystalline phase is thought to function as a structure-directing medium or template for reduction to the porous metal. By controlling the nanostructure of the lyotropic liquid crystalline phase and reducing the mixture, porous metal-based material may be synthesised having a corresponding nanostructure. For example, porous metal-based materials formed from normal topology hexagonal phases will have a system of pores disposed on an hexagonal lattice, whereas porous metal-based materials formed from normal topology cubic phases will have a system of pores disposed in cubic topology. Similarly, porous metal-based materials having a lamellar nanostructure may be deposited from lamellar phases. Accordingly, by exploiting the rich lyotropic polymorphism exhibited by liquid crystalline phases, the method of the invention allows precise control over the structure of the porous metal-based materials and enables the synthesis of well-defined porous metal-based materials having a long range spatially and orientationally periodic distribution of uniformly sized pores.

Any suitable amphiphilic organic compound or compounds capable of forming an homogeneous lyotropic liquid crystalline phase may be used as structure-directing agent, either low molar mass or polymeric. These may include compounds sometimes referred to as organic directing agents. In order to provide the necessary homogeneous liquid crystalline phase, the amphiphilic compound will generally be used at an high concentration, typically at least about 10% by weight, preferably at least 20% by weight, and more preferably at least 30% by weight, based on the total weight of the solvent and amphiphilic compound.

Preferably, the structure-directing agent comprises a surface-active organic compound of the formula $R_1R_2Q$ wherein $R_1$ and $R_2$ represent aryl or alkyl groups having from 6 to about 36 carbon atoms or combinations thereof, and Q represents a group selected from: $(OC_2H_4)_nOH$, wherein n is an integer from about 2 to about 20; nitrogen bonded to at least two groups selected from alkyl having at least 4 carbon atoms, and aryl; and phosphorus or sulphur bonded to at least 4 oxygen atoms.

Other suitable compounds include organic surfactant compounds of the formula RQ wherein R represents a linear or branched alkyl, aryl, aralkyl or alkylaryl group having from 6 to about 60 carbon atoms, preferably from 12 to 18 carbon atoms, and Q represents a group selected from: $[O(CH_2)_m]_nOH$ wherein m is an integer from 1 to about 4 and preferably m is 2, and n is an integer from 2 to about 60, preferably from 4 to 8; nitrogen bonded to at least one group selected from alkyl having at least 4 carbon atoms, aryl, aralkyl and alkylaryl; and phosphorus or sulphur bonded to at least 2 oxygen atoms. Other suitable structure-directing agents include monoglycerides, phospholipids and glycolipids.

Preferably non-ionic surfactants such as octaethylene glycol monododecyl ether ($C_{12}EO_8$, wherein EO represents ethylene oxide) and octaethylene glycol monohexadecyl ether ($C_{16}EO_8$) are used as structure-directing agents.

In most cases, the source material will dissolve in the solvent domains of the liquid crystalline phase, but in certain cases the source material may be such that it will dissolve in the hydrophobic domains of the phase.

The mixture may optionally further include a hydrophobic hydrocarbon additive to modify the pore diameter of the porous metal-based material, as explained more fully below. Suitable hydrocarbon additives include n-heptane, n-tetradecane and mesitylene. The hydrocarbon additive may be present in the mixture in a molar ratio to the structure-directing agent in the range of 0.1 to 4, preferably 0.5 to 1.

A reducing agent is used to reduce the mixture. Suitable reducing agents include metals zinc, iron and magnesium, hydrogen gas, and hydrazine, preferably zinc metal.

Typically, the pH of the mixture may be adjusted to a value in the range from 2 to 12. The temperature is generally maintained in the range from 15 to 100° C., preferably 18 to 80° C., more preferably 20 to 40° C.

The mixture and reducing agent are left to stand for a sufficient period to precipitate the porous metal, typically overnight at room temperature. Depending on the nature of the reactants, the mixture may be left for a period of from 15 minutes to 4 weeks, and typically for about 24 hrs. Following the reduction, it will usually be desirable to treat the porous metal-based material to remove the organic material including the structure-directing agent, hydrocarbon additive, unreacted source material and ionic impurities, for example by solvent extraction or by decomposition in nitrogen and combustion in oxygen (calcination). However, for certain applications such treatment may not be necessary.

The porous metal-based material may then optionally be subjected to further treatment, for example, to chemical treatment to form surface layers, for example by reaction with hydrogen sulphide gas to form metal sulphide or by adsorption of alkane thiols or other surface active materials, or to physical treatment, for example by adsorption of proteins such as enzymes, or by doping with Group I or II metals.

It has been found that the pore size of the porous metal-based material can be varied by altering the hydrocarbon chain length of the surfactant used as structure-directing agent, or by supplementing the surfactant by an hydrocarbon additive. For example, shorter-chain surfactants will tend to direct the formation of smaller-sized pores whereas longer-chain surfactants tend to give rise to larger-sized pores. The addition of an hydrophobic hydrocarbon additive such as n-heptane, to supplement the surfactant used as structure-directing agent, will tend to increase the pore size, relative to the pore size achieved by that surfactant in the absence of the additive. Also, the hydrocarbon additive may be used to alter the phase structure of the liquid crystalline phase in order to control the corresponding regular structure of the porous metal-based material.

The porous metal-based materials obtained according to the present invention typically have particle diameter sizes from 90 nanometers to 2 millimeters. It has been found that the pore size of the porous metal-based material can be varied by altering the hydrocarbon chain length of the surfactant used as structure-directing agent, or by supplementing the surfactant by an hydrocarbon additive.

Using the method according to the invention, regular porous metal-based materials that are conducting phases can be prepared with pore sizes in mesoporous and macroporous ranges, possibly up to a pore size of about 300 Å. By "mesoporous" as referred to herein is meant a pore diameter within the range from about 13 to 200 Å, and by "macroporous" is meant pore diameters exceeding about 200 Å. Preferably, the metal-based materials are mesoporous, more preferably having a pore diameter within the range from 14 to 100 Å, and most preferably within the range from 17 to 50 Å.

The porous metal-based material has pores of substantially uniform size. By "substantially uniform" is meant that at least 75% of pores have pore diameters to within 60%, preferably within 30%, more preferably within 15%, and most preferably within 5%, of average pore diameter.

The regular structure of the porous metal-based material may for example be cubic, lamellar, oblique, centred rectangular, body-centred orthorhombic, body-centred tetragonal, rhombohedral or hexagonal. Preferably the regular structure is hexagonal.

BRIEF DESCRIPTION OF THE DRAWINGS

The porous metal-based materials obtainable in accordance with the present invention may be further illustrated with reference to the accompanying drawings in which.

Figure 1:
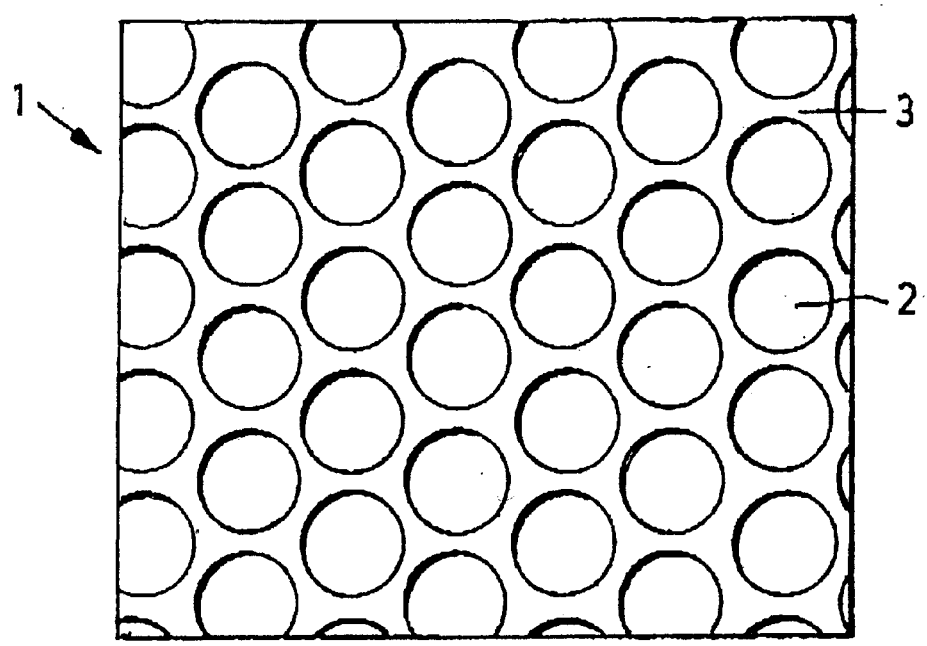
FIG. 1 is a schematic representation of a mesoporous metal-based material that has an hexagonal structure.

In the embodiment illustrated in FIG. 1, the porous metal-based material 1 has an hexagonal arrangement of open channels 2 that can be synthesised with internal diameters of about 13 Å to about 200 Å in a metal matrix 3.

The term "hexagonal" as used herein encompasses not only materials that exhibit mathematically perfect hexagonal symmetry within the limits of experimental measurements, but also those with significant observable deviations from the ideal state, provided that most channels are surrounded by an average of six nearest-neighbour channels at substantially the same distance.

Figure 2:
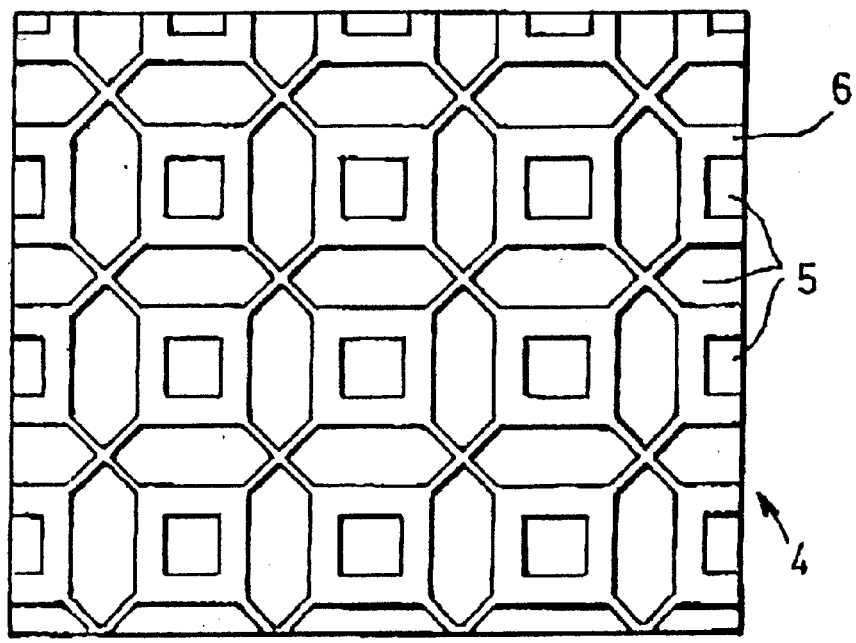
FIG. 2 is a schematic representation of a mesoporous metal-based material that has a cubic nanostructure.

A further embodiment illustrated in FIG. 2 shows a porous metal-based material 4 with a cubic arrangement of about 13 Å to about 200 Å in a metal matrix 6. The term "cubic" as used herein encompasses not only materials that exhibit mathematically perfect symmetry belonging to cubic space groups within the limits of experimental measurement, but also those with significant observable deviations from the ideal state, provided that most channels would be connected to between two and six other channels.

In their calcined or solvent-extracted forms the porous metal-based materials obtainable by the method of the invention may be characterised by an X-ray diffraction pattern with at least one peak at a position greater than about 18 Å units d-spacing (4.909 degrees two-theta for Cu K-alpha radiation) and by examination using transmission electron microscopy or scanning tunnelling microscopy. Transmission electron microscopy typically shows that the size of the pores is uniform to within 15% of the average pore size.

Porous metal-based materials prepared by the method of the present invention may be expressed by the empirical formula:

$$M_xA_h$$

wherein M is a metallic element, such as a first, second or third row transition metal, preferably platinum, palladium, nickel, gold or chromium, more preferably platinum or nickel, or a combination thereof, x is the number of moles or mole fraction of M, A is oxygen, sulphur or hydroxyl, or a combination thereof, and h is the number of moles or mole fraction of A. Preferably x is greater than h, particularly preferably the ratio h/x is in the range 0 to 0.4, most preferably in the range 0 to 0.1.

In the as-synthesised form the porous metal-based materials prepared by the method of this invention have a composition, on an anhydrous basis, expressed empirically as follows:

$$S_qM_xA_h$$

wherein S is the total organic directing material, q is the number of moles, or mole fraction, of S, and $M_xA_h$, is as defined above. The S component is associated with the materials as a result of its presence during the synthesis, and, as already mentioned, may easily be removed by extraction with solvent or by decomposition in nitrogen and combustion in oxygen (calcination).

The porous metal-based materials in accordance with the invention have pores of uniform diameter, in contrast to hitherto obtainable porous metal-based materials. Also, the porous metal-based materials according to the invention may have architectures which hitherto could not be obtained by other processes. Furthermore, the porous metal-based materials may have high specific surface areas, high double layer capacitances and provide a low effective series resistance to electrolyte diffusion. Porous metal-based materials may be prepared which exhibit greater mechanical, electrochemical, chemical and thermal durability than porous metal-based materials obtained by other methods.

The porous metal-based materials in accordance with the invention may have applications as follows: in sensors such as gas sensors, for example for carbon monoxide, methane, hydrogen sulphide, or in "electronic nose" applications, chemical sensors, for example for process control in the chemicals industry, and biosensors, for example for glucose or therapeutic drugs; in batteries, for example as anode and cathode electrodes; in fuel cells, for example as anode and cathode electrodes or solid electrolyte; in solar cells, for example as collectors or supports for organometallic species; in electrochromic devices such as display devices or smart windows; in field emitters, for example display devices or electronic devices; in electrocatalysis, for example in enzyme mimicry or "clean synthesis" of pharmaceuticals; in magnetic devices, for example magnetic recording media or giant magnetoresistive media; in optical devices such as non-linear optical media, evanescent wave devices, surface plasmon polariton devices, or optical recording media; for scientific applications such as in surface enhanced optical processes, chemical reactions in confined geometries, or physical processes in confined geometries; for chemical separations, for example in electrostatic precipitators or gas separators; and for use as catalysts, electrode material, fluid storage media, and sorbents.

BEST MODE

Preferably a mixture of octaethylene glycol monohexadecyl ether ($C_{16}EO_8$), water and hexachloroplatinic acid is heated and shaken vigorously to form an hexagonal liquid crystalline phase. A piece of zinc metal is then inserted into the mixture as reducing agent and the reaction mixture was allowed to stand at room temperature overnight. Organic matter, unreacted hexachloroplatinic acid, and zinc salts may then be removed from the resultant product, using acetone, dilute sulphuric acid, and distilled water, to obtain porous platinum metal.

EXAMPLES

Example 1

0.235 grams of octaethylene glycol monohexadecyl ether ($C_{16}EO_8$) was mixed with 0.201 grams of water and 0.283 grams of hexachloroplatinic acid. The mixture was heated and shaken vigorously. Upon examination using a polarized light microscope the mixture was observed to have an optical texture characteristic of an hexagonal liquid crystalline phase. A piece of zinc metal was inserted into the mixture as reducing agent. The reaction mixture was allowed to stand at room temperature overnight. Organic matter, unreacted hexachloroplatinic acid, and zinc salts were removed from the resultant product with acetone, dilute sulphuric acid, and distilled water. Upon examination by transmission electron microscopy the metal product was found to have an hexagonal disposition of pores with internal diameters of 34 Å separated by a metal wall at least 18 Å wide.

Example 2

0.235 grams of octaethylene glycol monohexadecyl ether ($C_{16}EO_8$) was mixed with 0.116 grams of water and 0.283 grams of hexachloroplatinic acid. The mixture was heated and shaken vigorously. Upon examination using a polarized light microscope the mixture was observed to be highly viscous and to have no birefringence. The presence of air bubbles having a faceted appearance indicated that the mixture was in a cubic liquid crystalline phase. A piece of zinc metal was inserted into the mixture as reducing agent and the reaction mixture was allowed to stand at room temperature overnight. Organic matter, unreacted hexachloroplatinic acid, and zinc salts were removed from the resulting product with acetone, dilute sulphuric acid and distilled water. Upon examination by transmission electron microscopy the metal product was found to have a cubic disposition of pores with internal diameters of 30 Å separated by a metal wall at least 18 Å wide.

Example 3

0.235 grams of octaethylene glycol monohexadecyl ether ($C_{16}EO_8$) was mixed with 0.201 grams of water and 0.283 grams of hexachloroplatinic acid. The mixture was heated and shaken vigorously. Upon examination using a polarized light microscope the mixture was observed to have an optical texture characteristic of an hexagonal liquid crystalline phase. Hydrogen gas as reducing agent was introduced into the reaction vessel, and the mixture allowed to stand for 24 hours. Organic matter and unreacted hexachloroplatinic acid were removed from the resulting product with acetone and distilled water. Upon examination by transmission electron microscopy the metal product was found to have a cubic disposition of pores with internal diameters of 34 Å separated by a metal wall at least 18 Å wide.

Example 4

0.235 grams of octaethylene glycol monohexadecyl ether ($C_{16}EO_8$) was mixed with 0.201 grams of water and 0.283 grams of hexachloroplatinic acid. The mixture was heated and shaken vigorously. Upon examination using a polarized light microscope the mixture was observed to have an optical texture characteristic of an hexagonal liquid crystalline phase. 0.235 grams of octaethylene glycol monohexadecyl ether ($C_{16}EO_8$) was mixed with 0.116 grams of hydrazine hydrate solution in water. The mixture was shaken vigorously. Upon examination using a polarized light microscope the mixture was observed to have an optical texture characteristic of an hexagonal liquid crystalline phase. The liquid crystalline hydrazine-containing mixture as reducing agent was mixed with the hexachloroplatinic acid-containing mixture and the reaction mixture allowed to stand for 3 hours. Organic matter and unreacted hexachloroplatinic acid and hydrazine were removed from the resulting product with acetone and distilled water. Upon examination by transmission electron microscopy the metal product was found to have a cubic disposition of pores with internal diameters of 34 Å separated by a metal wall at least 18 Å wide.

What is claimed is:

1. A method of preparing a porous metal-based material having a substantially regular structure and uniform pore size which comprises reducing a mixture comprising: a source of metal; a solvent; and a structure-directing agent present in an amount sufficient to form a liquid crystalline phase in the mixture, to form a composite of metal-based material and organic -matter, and optionally removing organic matter from the composite.

2. A method according to claim 1 wherein the mixture comprises a liquid crystalline phase exhibiting a hexagonal topology.

3. A method according to claim 1 wherein the mixture comprises a source of a metal selected from platinum, palladium, nickel and gold.

4. A method according to claim 1 wherein the solvent is water.

5. A method according to claim 1 wherein the structure-directing agent is octaethylene glycol monohexadecyl ether.

6. A method according to claim 1, wherein the mixture is reduced using zinc metal as a reducing agent.

7. A porous metal-based material having a substantially regular structure and substantially uniform pore size, wherein the pore size is in the mesoporous range.

8. A porous metal-based material according to claim 7 wherein 75% of the pores have pore diameters to within 15% of the average pore diameter.

9. A porous metal-based material according to claim 7, wherein the regular structure is hexagonal.

10. A porous metal-based material according to claim 7 expressed by the empirical formula:

$$M_xA_h$$

wherein M is a metallic element, such as a first, second or third row transition metal, preferably platinum, palladium, nickel, gold or chromium, more preferably platinum or nickel, or a combination thereof; x is the number of moles or mole fraction of M; A is oxygen, sulphur or hydroxyl, or a combination thereof; h is the number of moles or mole fraction of A; and x is greater than h.

* * * * *